United States Patent
Mitsch et al.

(10) Patent No.: US 12,104,718 B2
(45) Date of Patent: Oct. 1, 2024

(54) FIBER REINFORCED HOSES, COMPOSITE MATERIALS AND ARTICLES, AND RELATED METHODS

(71) Applicant: GaMra Composites, Inc., Hudson, WI (US)

(72) Inventors: Gregory S. Mitsch, Woodbury, MN (US); Richard Lindmark, Anoka, MN (US); Roger Worm, Minneapolis, MN (US)

(73) Assignee: GaMra Composites, Inc., Hudson, WI (US)

( * ) Notice: Subject to any disclaimer, the term of this patent is extended or adjusted under 35 U.S.C. 154(b) by 89 days.

(21) Appl. No.: 17/673,743

(22) Filed: Feb. 16, 2022

(65) Prior Publication Data

US 2022/0260185 A1 Aug. 18, 2022

Related U.S. Application Data

(60) Provisional application No. 63/150,468, filed on Feb. 17, 2021.

(51) Int. Cl.
*F16L 11/08* (2006.01)
*B29C 48/10* (2019.01)
(Continued)

(52) U.S. Cl.
CPC ............ *F16L 11/082* (2013.01); *B29C 48/10* (2019.02); *B29C 70/52* (2013.01); *B29K 2023/14* (2013.01); *B29L 2023/005* (2013.01)

(58) Field of Classification Search
CPC ........ F16L 11/082; B29C 48/10; B29C 70/52; B29K 2023/14; B29L 2023/005
(Continued)

(56) References Cited

U.S. PATENT DOCUMENTS 3,310,447 A 3/1967 Matthews
3,463,197 A 8/1969 Slade
(Continued)

FOREIGN PATENT DOCUMENTS

DE 19633544 A1 3/1997
EP 0296890 A2 12/1988
(Continued)

OTHER PUBLICATIONS

McDonough et al., "Top 8 Reasons Hydraulic Hoses Fail," Fluid Gas Handling Team, Sep. 2016, 6 pages.
(Continued)

*Primary Examiner* — David R Deal
(74) *Attorney, Agent, or Firm* — Husch Blackwell LLP (57) ABSTRACT

A flexible fiber reinforced hose adapted for conveying fluids under pressure. The reinforced hose having a core tube having at least one reinforcement layer surrounding an outer core tube surface. Each reinforcement layer having one or more woven mats, unwoven mats, or bundle of fibers comprising a plurality of reinforcement fibers that has a binder-resin filling at least a portion of the voids of the reinforcement fibers. In some aspects, the binder-resin adheres to the reinforcement fibers and displaces the air voids at the interface between the reinforcement fibers and the binder-resin. The binder-resin has a relatively low viscosity less than at least about 20,000 centipoise at 176° C. and low molecular weight, which allows the reinforcement layer to maintain a low flex modulus while maintaining or increasing tensile modulus. The reinforced hose also has at least one polymer layer that bonds to the binder-resin of the reinforcement layer, preferably being cross-linkable or cross-linked to the polymer layer.

22 Claims, 3 Drawing Sheets

(51) Int. Cl.
*B29C 70/52* (2006.01)
*B29K 23/00* (2006.01)
*B29L 23/00* (2006.01)

(58) Field of Classification Search
USPC ........................................................ 138/129
See application file for complete search history.

(56) References Cited

U.S. PATENT DOCUMENTS

| | | | |
|---|---|---|---|
| 3,605,818 A | 9/1971 | Balchan | |
| 3,682,201 A | 8/1972 | Atwell et al. | |
| 3,866,631 A * | 2/1975 | Chudgar | F16L 11/085 138/125 |
| 3,918,499 A | 11/1975 | Higbee | |
| 4,000,759 A | 1/1977 | Higbee | |
| 4,228,824 A | 10/1980 | Evans et al. | |
| 4,261,390 A | 4/1981 | Belofsky | |
| 4,273,160 A | 6/1981 | Lowles | |
| 4,275,937 A | 6/1981 | Belofsky | |
| 4,349,049 A | 9/1982 | Silvey | |
| 4,384,595 A | 5/1983 | Washkewicz et al. | |
| 4,439,387 A | 3/1984 | Hawley | |
| 4,488,577 A | 12/1984 | Shilad et al. | |
| 4,549,920 A | 10/1985 | Cogswell et al. | |
| 4,559,262 A | 12/1985 | Cogswell et al. | |
| 4,617,213 A | 10/1986 | Asano et al. | |
| 4,668,318 A | 5/1987 | Piccoli et al. | |
| 4,699,178 A | 10/1987 | Washkewicz et al. | |
| 4,759,388 A * | 7/1988 | Kiyama | F16L 11/082 138/137 |
| 4,764,427 A | 8/1988 | Hara et al. | |
| 4,870,995 A | 10/1989 | Igarashi et al. | |
| 4,952,262 A | 8/1990 | Washkewicz et al. | |
| 5,019,450 A | 5/1991 | Cogswell et al. | |
| 5,176,180 A | 1/1993 | Williams et al. | |
| 5,188,872 A | 2/1993 | Quigley | |
| 5,209,136 A | 5/1993 | Williams | |
| 5,213,889 A | 5/1993 | Cogswell et al. | |
| 5,234,058 A | 8/1993 | Sas-Jaworsky et al. | |
| 5,330,807 A | 7/1994 | Williams | |
| 5,348,096 A | 9/1994 | Williams | |
| 5,380,571 A | 1/1995 | Ozawa et al. | |
| 5,437,899 A | 8/1995 | Quigley | |
| RE35,081 E | 11/1995 | Quigley | |
| 5,525,003 A | 6/1996 | Williams et al. | |
| 5,526,848 A * | 6/1996 | Terashima | B32B 1/08 138/125 |
| 5,540,870 A | 7/1996 | Quigley | |
| 5,556,677 A | 9/1996 | Quigley et al. | |
| 5,580,626 A | 12/1996 | Quigley et al. | |
| 5,795,834 A | 8/1998 | Deeb et al. | |
| 5,848,619 A | 12/1998 | Ally | |
| 5,868,169 A | 2/1999 | Catallo | |
| 5,888,601 A | 3/1999 | Quigley et al. | |
| 5,913,337 A | 6/1999 | Williams et al. | |
| 5,921,285 A | 7/1999 | Quigley et al. | |
| 6,004,639 A | 12/1999 | Quigley et al. | |
| 6,016,845 A | 1/2000 | Quigley et al. | |
| 6,062,996 A | 5/2000 | Quigley et al. | |
| 6,099,910 A | 8/2000 | Woodside | |
| 6,148,866 A | 11/2000 | Quigley et al. | |
| 6,170,532 B1 | 1/2001 | Campbell | |
| 6,286,558 B1 | 9/2001 | Quigley et al. | |
| 6,298,884 B1 | 10/2001 | Neto et al. | |
| 6,357,485 B2 | 3/2002 | Quigley et al. | |
| 6,604,550 B2 | 8/2003 | Quigley et al. | |
| 6,631,742 B1 | 10/2003 | Hagiwara et al. | |
| 6,756,114 B2 | 6/2004 | Cichocki et al. | |
| 6,776,195 B2 | 8/2004 | Blasko et al. | |
| 6,807,988 B2 | 10/2004 | Powell et al. | |
| 6,828,024 B1 | 12/2004 | Flautt et al. | |
| 6,849,331 B1 | 2/2005 | Flautt et al. | |
| 6,857,452 B2 | 2/2005 | Quigley et al. | |
| 6,896,963 B2 | 5/2005 | Piret et al. | |
| 7,026,377 B1 | 4/2006 | Grant | |
| 7,523,765 B2 | 4/2009 | Quigley et al. | |
| 7,647,948 B2 | 1/2010 | Quigley et al. | |
| 7,743,793 B2 | 6/2010 | Lord et al. | |
| 7,875,675 B2 | 1/2011 | Brown et al. | |
| 7,901,762 B2 | 3/2011 | Brown et al. | |
| 8,001,997 B2 | 8/2011 | Quigley et al. | |
| 8,042,363 B2 | 10/2011 | Kibol et al. | |
| 8,066,033 B2 | 11/2011 | Quigley et al. | |
| 8,101,107 B2 | 1/2012 | Brown et al. | |
| 8,187,687 B2 | 5/2012 | Wideman et al. | |
| 8,327,887 B2 | 12/2012 | Lockhart et al. | |
| 8,378,094 B2 | 2/2013 | Shooshtari et al. | |
| 8,399,064 B2 | 3/2013 | Schultz et al. | |
| 8,519,050 B2 | 8/2013 | Brown et al. | |
| 8,597,016 B2 | 12/2013 | Brown et al. | |
| 8,678,041 B2 | 3/2014 | Quigley et al. | |
| 8,678,042 B2 | 3/2014 | Quigley et al. | |
| 8,763,647 B2 | 7/2014 | Quigley et al. | |
| 8,783,300 B2 | 7/2014 | Hahn et al. | |
| 8,826,791 B2 | 9/2014 | Thompson et al. | |
| 8,985,154 B2 | 3/2015 | Quigley et al. | |
| 9,493,612 B2 | 11/2016 | Block et al. | |
| 9,650,498 B2 | 5/2017 | Gleich et al. | |
| 9,725,564 B2 | 8/2017 | Block et al. | |
| 9,863,558 B2 | 1/2018 | Rooke et al. | |
| 10,066,765 B2 | 9/2018 | Jaspaert | |
| 10,281,064 B2 | 5/2019 | Moreau et al. | |
| 2001/0025664 A1 | 10/2001 | Quigley et al. | |
| 2002/0061374 A1 | 5/2002 | O'Brien et al. | |
| 2002/0100516 A1 | 8/2002 | Powell et al. | |
| 2002/0157720 A1 | 10/2002 | Quigley et al. | |
| 2003/0087052 A1 | 5/2003 | Wideman et al. | |
| 2003/0176565 A1 | 9/2003 | Piret et al. | |
| 2004/0031532 A1 | 2/2004 | Quigley et al. | |
| 2004/0265524 A1 | 12/2004 | Wideman et al. | |
| 2004/0265556 A1 | 12/2004 | Flautt et al. | |
| 2005/0121094 A1 | 6/2005 | Quigley et al. | |
| 2007/0028983 A1 | 2/2007 | Lord et al. | |
| 2007/0125439 A1 | 6/2007 | Quigley et al. | |
| 2008/0006338 A1 | 1/2008 | Wideman et al. | |
| 2008/0143010 A1 | 6/2008 | Kashikar et al. | |
| 2008/0185065 A1 * | 8/2008 | Dreckotter | B32B 1/08 138/143 |
| 2008/0210329 A1 | 9/2008 | Quigley et al. | |
| 2008/0277818 A1 | 11/2008 | Kibol et al. | |
| 2009/0173406 A1 | 7/2009 | Quigley et al. | |
| 2009/0211660 A1 * | 8/2009 | Johnson | F16L 11/086 138/146 |
| 2010/0092695 A1 | 4/2010 | Schultz et al. | |
| 2010/0101676 A1 | 4/2010 | Quigley et al. | |
| 2010/0212769 A1 | 8/2010 | Quigley et al. | |
| 2010/0282354 A1 * | 11/2010 | Polasky | B29C 70/30 156/149 |
| 2010/0317791 A1 | 12/2010 | Stockreiter et al. | |
| 2011/0036442 A1 | 2/2011 | Hahn et al. | |
| 2012/0118423 A1 | 5/2012 | Quigley et al. | |
| 2012/0155813 A1 | 6/2012 | Quigley et al. | |
| 2012/0266996 A1 | 10/2012 | Wideman et al. | |
| 2013/0146171 A1 | 6/2013 | Quigley et al. | |
| 2014/0106166 A1 | 4/2014 | Nelson et al. | |
| 2014/0272417 A1 | 9/2014 | Zeidan | |
| 2017/0130876 A1 | 5/2017 | Gopalan et al. | |
| 2017/0137585 A1 | 5/2017 | Heikkila et al. | |
| 2020/0115516 A1 | 4/2020 | Heikkila et al. | |
| 2022/0258440 A1 | 8/2022 | Mitsch et al. | |

FOREIGN PATENT DOCUMENTS

| | | |
|---|---|---|
| EP | 0296890 A3 | 12/1990 |
| EP | 0733469 B1 | 4/2001 |
| JP | H 09264465 A | 10/1997 |
| JP | H 10141551 A | 5/1998 |
| JP | 3003769 B2 | 11/1999 |
| JP | 2005188607 A | 7/2005 |
| JP | 2009154485 A | 7/2009 |
| JP | 2009210085 A | 9/2009 |

(56) References Cited

FOREIGN PATENT DOCUMENTS

| WO | WO 2011/163365 A2 | 12/2011 |
| WO | WO 2017/047025 A1 | 3/2017 |
| WO | WO 2018/071352 A1 | 4/2018 |

OTHER PUBLICATIONS

Mason, "Sizing Up Fiber Sizings," Composites World, Apr. 2006, 7 pages.
Parker Hannifin Corporation, "TOUCHJACKET High Pressure Hose," Jun. 2018, 2 pages.
Wikipedia, "Cross-Linked Polyethylene," 14 pages.
Thomason, "Glass Fibre Sizing: A Review," Science Direct, University of Strathclyde, Department of Mechanical and Aerospace Engineering, 2019, 24 pages.
Clariant Brochure for Masterbatch Sole Carrier with Universal Application, 2013, 8 pages.
Clariant Flyer Metallocene Waxes for PVD Extrusion Licocene PP6102 Licocene PE4201, 2013, 2 pages.
Dow Affinity GA1900, 2011, 2 pages.
Dow Affinity GA1950, 2011, 2 pages.
Dow Technical Information, Engage 8200 Polyolefin Elastomer, 2011, 3 pages.
ExxonMobil, Vistamaxx Performance Polymer 3020FL, Product Data Sheet, 2020, 2 pages.
ExxonMobil, Vistamaxx Performance Polymer 6102, Product Data Sheet, 2020, 2 pages.
Application and File history for U.S. Appl. No. 17/673,751, filed Feb. 16, 2022. Inventors: Mitsch et al.
U.S. Appl. No. 17/673,751, Office Action dated Dec. 21, 2023, 9 pages.

\* cited by examiner

FIBER REINFORCED HOSES, COMPOSITE MATERIALS AND ARTICLES, AND RELATED METHODS

CROSS-REFERENCE TO RELATED APPLICATION

This application claims the benefit of U.S. Provisional Application No. 63/150,468 filed on Feb. 17, 2021 and entitled "FIBER REINFORCED COMPOSITE MATERIALS, ARTICLES AND RELATED METHODS," the disclosure of which is incorporated herein by reference in its entirety.

TECHNICAL FIELD

The present invention relates to fiber-reinforced composite materials, related articles, and methods of producing and using the same, particularly wherein the fiber-reinforced compositions comprise one or more filaments of a fiber wetted in the void space with a heterophase polymer having sufficiently low molecular weight and/or viscosity to maintain low flex modulus while maintaining or increasing tensile modulus.

BACKGROUND

Many industries (e.g., automotive, construction, medical, mining, petrochemical, etc.) use hose assemblies to safely transfer pressurized fluids. These hose assemblies can be used for a variety of fluids, such as foods, fuel mixtures, fuel additives, and chemicals and can be exposed to extreme pressures, temperatures, and environmental conditions. They can also be subjected to physical stresses, such as bending, repeated movement, and other forces.

Thermoset hose assemblies are quite common and constructed using rubber compounds in a multi-step process. In the process, a mandrel is used in a cross-head extrusion process where the thermoset tube stock is extruded over the top at relatively high speeds. This matrix is then cooled and recoiled, put into work-in-process storage, and uncoiled into a wire braiding operation. The braiding operation is typically much slower and a reinforcement of textile, steel, or similar material is either braided over the top or in some cases spiral wound, depending on the end use and the required burst strengths. Multiple layers of reinforcement may be braided or wound over the top, typically in opposite directions. These are then recoiled and brought to a cover line where the outer layer of rubber is applied, typically at higher speeds compared to the braiding operation. After covering and possibly jacketing, the entire assembly is then recoiled in large rolls and submitted to a steam auto clave for cross-linking of the thermoset rubber for approximately one hour. Post auto clave, the roll is cooled to room temperature, uncoiled on a large table, and the hose/mandrel assembly is subjected to a blowout operation where water is used to push the mandrel out of the composite hose.

This entire process is slow, capital intensive, limits the length of continuous hose and is fraught with quality problems. The rubber materials are dry blended in batch mode. The chemical bonding of the brass coated wire to the rubber may be interfered with by the presence of moisture. This type of processing is prone to inhomogeneous mixtures and environmental conditions that result in pin-hole failures and burst strength inconsistencies.

There is a need in the industry for cost-effective hose assemblies that can be manufactured in a simpler and more time-efficient manner. This is also a need for hose assemblies that can withstand the safe transfer of a variety of pressurized fluids while being exposed to extreme pressures, temperatures, and environmental conditions and mechanical stresses without compromising the integrity and long-term usage of the hose assemblies.

SUMMARY

The present invention is generally directed to fiber-reinforced composites, articles comprising the fiber-reinforced composites, and related methods of making or using the same.

The fiber-reinforced composites of the present invention include reinforcement fibers at least partially treated or otherwise engaged with (e.g., through coating, wetting, impregnation, bonding, etc.) one or more resin-binders.

In some aspects, the resin-binders are preferably of low viscosity and low molecular weight, such as metallocene polyethylene or polypropylene polymers. Without intending to be bound by theory, the one or more resin-binders, having sufficiently low molecular weight and viscosity, can fill or otherwise reduce interstices, voids, air bubbles, or flaws within the reinforcement fiber or that might potentially form at an interface between the fiber, polymeric matrix, or other material, thereby reducing interfacial surface tension and providing greater compatibility between the materials.

In some aspects, one or more resin-binders can form at least a portion of the surfaces that may be incorporated in successive layers. The one or more resin-binders of the composites can be cross-linked to provide desired properties for end-use applications.

In certain aspects, the composites of the present invention include at least one resin-binder having a sufficiently low viscosity to at least fill or otherwise reduce interstices, voids, air bubbles, or flaws within the reinforcement fibers. In some aspects, the at least one resin-binder has a melt viscosity of less than about 20,000 centipoise at 176° C., in some aspects less than about 15,000 centipoise at 176° C., in some aspects less than about 10,000 centipoise at 176° C., in some aspects less than about 5,000 centipoise at 176° C., in some aspects less than about 2000 centipoise at 176° C., in some aspects less than about 1500 centipoise at 176° C., in some aspects less than about 1000 centipoise at 176° C., in some aspects less than about 750 centipoise at 176° C., in some aspects less than about 500 centipoise at 176° C., in some aspects less than about 250 centipoise at 176° C., and in some preferred aspects less than about 200 centipoise at 176° C. In some aspects, the at least one resin-binder has a melt viscosity between about 150 and about 20,000 centipoise at 176° C., in some aspects between about 150 and about 15,000 centipoise at 176° C., in some aspects between about 150 and about 10,000 centipoise at 176° C., in some aspects between about 150 and about 7,000 centipoise at 176° C., in some aspects between about 150 and about 5,000 centipoise at 176° C., in some aspects between about 150 and about 2000 centipoise at 176° C., in some preferred aspects between about 150 and about 1000 centipoise at 176° C., and in some even more preferred aspects between about 150 and about 500 centipoise at 176° C.

In some aspects, the at least one resin-binder can include one or more metallocene polyethylene polymer, which may be obtained through polymerizing an ethylene monomer with an α-olefin (e.g., butene, hexene, octene) using a metallocene catalytic system, or a metallocene polypropylene polymer. In some aspects, the at least one resin-binder can include a polymer in which a functional group or functionalizing component has been grafted to the polymer (e.g., to make a functionalized metallocene polyethylene polymer). In some aspects, the at least one resin-binder can be selected to provide greater compatibility with the reinforcement fiber, the polymeric matrix, and any successive layers that may be applied.

In some aspects, the composites of the present invention include at least one reinforcement layer. The reinforcement layer may comprise a woven fiber mat, unwoven fiber mat or a bundle of fibers, each comprising a plurality of reinforcement fibers (e.g., aramid, carbon, glass, wood, etc.). In some aspects, the reinforcement fibers may preferably comprise fiberglass for many applications. The size of the reinforcement fibers, such as a fiberglass filament, can vary and may be selected to improve compatibility, for example, from at least about 9 microns and up to about 14 microns in some applications.

In some aspects, the plurality of reinforcement fibers may include fiberglass having glass fiber sizing. In some aspects, a binder can be used in addition to glass fiber sizing, which typically incorporates a film former and coupling agent, to provide better resin, process, and end-use compatibility.

In some aspects, the composites optionally include a polymer matrix comprising at least one polymer. The polymer can be selected to provide desired properties (e.g., flexibility, fluid incompatibility, strength, elongation, coefficient of thermal expansion, tensile strength, flexural modulus, etc.). A variety of different polymers may be used, including thermoplastics. In some preferred aspects, a cross-linkable or cross-linked polymer can be used to form the polymeric matrix. For cross-linkable polymers, a variety of different mechanisms can be used to facilitate cross-linking, including radiation, silane grafting, peroxide, or azo methods. In some aspects, the polymer can be a cross-linkable or cross-linked thermoplastic, like cross-linkable polyethylene (XPLE) or cross-linked polyethylene (PEX). In some embodiments, the polymer and resin-binder may be selected for compatibility and cross-linkability, e.g., an XPLE resin-binder and polymer.

In some aspects, a fiber-reinforced composite of the present invention includes at least one reinforcement layer comprising fiberglass, a resin-binder wetted within the voids of the fiberglass comprising a cross-linkable, metallocene polyethylene polymer, and a polymer comprising XPLE in the polymer matrix.

In some aspects, a fiber-reinforced composite of the present invention includes a liner low-density polyethylene polymer or copolymer as the resin-binder, an XPLE as a polymer in the polymer matrix, and fiberglass as the reinforcement fiber layer.

Embodiments include a variety of articles incorporating fiber-reinforced composites of the present invention. In other preferred embodiments, a flexible hose adapted for conveying fluids under pressure can include fiber-reinforced composites of the present invention.

In some aspects, the hose can have an inner core, one or more reinforcement layers including one or more reinforcement fibers wetted by at least one resin-binder, one or more polymer layers, and an optional protection layer as a cover.

In some aspects, the one or more reinforcement layers, including the plurality of reinforcement fibers, can be woven, braided, knitted, stitched, circumferentially, axially or hoop wound, helically wound, spiral wound or otherwise oriented (e.g., with an orientation between about thirty degrees and about seventy degrees relative to a longitudinal axis of the hose).

In some aspects, a first reinforcement layer surrounds the core tube and is formed of one or more filaments of a first fiber and wound around an outer tube surface of the core tube in a first winding direction, and a second reinforcement layer surrounds the first reinforcement layer and is formed of one or more filaments of a second fiber and wound around the first reinforcement layer in second winding direction opposite said first winding direction. In some aspects, there is a polymer layer intermediate the first and second reinforcement layers that is bonded to the resin-binder of each of the first and second reinforcement layers.

In some aspects, a first reinforcement layer surrounds the core tube and is formed of one or more filaments of a first fiber and surrounds an outer tube surface of the core tube, and a second reinforcement layer surrounds the first reinforcement layer and is formed of one or more filaments of a second fiber. In some aspects, there is a polymer layer intermediate the first and second reinforcement layers that is bonded to the resin-binder of each of the first and second reinforcement layers.

In some preferred aspects, the one or more reinforcement layers comprise one or more extrudate layers that include at least one reinforcement layer having the plurality of reinforcement fibers wetted with one or more resin-binders, wherein the one or more extrudate layers can comprises one or more layers of a hose or other layered article. In certain preferred aspects, the hose can include one or more polymer layers comprising a cross-linkable or cross-linked polymer, such that the inner layers provide strength capable of carrying winding of fiberglass layers and cross-head extrusion of further layers.

Embodiments of the present invention also include methods of making and using the fiber-reinforced composites and articles of the present invention. In some aspects, the fiber-reinforced composites and related articles are made using melt processing techniques, e.g., extrusion. In some embodiments, a method for making an article can include impregnating or coating at least a portion of the reinforcement fibers with a binder (e.g., by pultrusion), applying a cross-linkable thermoplastic resin-binder to the coated reinforcement fibers (optionally binder-wetted), extruding the polymer layer, such as a cross-linkable thermoplastic, as an extrudate, winding the reinforcement fibers about the extrudate, and initiating a cross-linking reaction to facilitate cross-linking between the reinforcement layer and the polymer layer. In some embodiments, no binder is employed prior to application of the resin-binder, but the reinforcement and polymer layers are cross-linkable or cross-linked.

In preferred embodiments, a hose assembly including a fiber-reinforced composite of the present invention can be continuously extruded without a mandrel and optionally cross-linked with one or more polymer layers during processing. In some embodiments, a mandrel may be used for a portion of processing. In some embodiments, a hose assembly that includes a fiber-reinforced composite of the present invention can be used to convey fluids under pressure.

The compositions, articles, and methods of producing and using the same can provide numerous benefits. The composites and articles, e.g., can provide better compatibility between reinforcement fibers and polymeric matrices and superior mechanical properties, including, in some applications, improved tensile strength while maintaining a desired flexural modulus. In some embodiments, the methods of making these composites and articles can provide a continuous alternative to batch processes typically employed. For hoses in particular, these composites, articles, and methods can provide better mechanical properties and reduce the failure modes of typical hoses, including those resulting from artifacts of processing with a mandrel.

In some aspects, the composites of the present invention maintain or have an increased tensile strength compared to the reinforcement fibers without the binder-resin, according to ASTM D2343.

In some aspects, the composites of the present invention maintain a flexural modulus of the reinforcement fibers.

The above summary is not intended to describe each illustrated embodiment or every implementation of the subject matter hereof. The detailed description more particularly exemplifies various illustrative embodiments.

DETAILED DESCRIPTION

Certain terminology may be employed in the following description for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

Unless the context indicates otherwise the following terms shall have the following meaning and shall be applicable to the singular and plural:

The terms "a," "an," "the," "at least one," and "one or more" are used interchangeably. For example, "a" layer means "one or more" layers.

The term "chemical resistance" refers to the ability to resist swelling, crazing, stress cracking, corrosion, or otherwise to withstand attack from mild acidic or alkaline solutions, phosphate-ester solutions, and alcohols and other organic solvents and hydrocarbons, as well as inorganic solvents such as water or brine.

The term "composite" means a material including two or more chemically and physically distinct phases separated by a distinct interface, e.g., a mixture of two or more of a resin-binder, fiber, polymeric material, and/or an additive or filler.

The term "crosslinkable polymer" refers to a polymeric material or composite that can be crosslinked upon exposure to moisture, heat, or actinic radiation after processing.

The term "elastomeric" refers to materials exhibiting rubber-like properties of compliancy, resiliency or compression deflection, low compression set, flexibility, and an ability to recover after deformation, i.e., stress relaxation.

The term "heterophase polymer" means a polymer having an amorphous character and at least some substantial crystalline content that can provide cohesive strength in the cooled adhesive mass. The crystalline content can be in the form of stereoregular blocks or sequences. The crystalline content of the heterophase polymer is in some aspects at least about 5 wt. %, in some aspects at least about 10 wt. %, in some aspects at least about 15 wt. %, in some aspects at least about 20 wt. %, in some aspects at least about 25 wt. %, in some aspects at least about 30 wt. %, in some aspects at least about 35 wt. %, in some aspects at least about 35 wt. %, in some aspects at least about 40 wt. %, in some aspects at least about 45 wt. %, and in some aspects at least about 50 wt. %, based upon the total weight of the heterophase polymer component.

The term "melt processable composition" means a formulation that is melt processed, typically at elevated temperatures, by means of a conventional polymer processing technique.

The term "melt processing technique" refers to a technique for applying thermal and mechanical energy to a process or polymer. Non-limiting examples include extrusion, injection molding, blow molding, rotomolding, or batch mixing.

The terms "polymer" and "polymeric" refer to a molecule of high relative molecular mass, the structure of which essentially contains multiple repetitions of units derived, actually or conceptually, from molecules of low relative molecular mass.

The terms "preferred" and "preferably" refer to embodiments that may afford certain benefits under certain circumstances. Other embodiments, however, may also be preferred, under the same or other circumstances. Furthermore, the recitation of one or more preferred embodiments does not imply that other embodiments are not useful, and is not intended to exclude other embodiments from the claimed scope.

The term "substrate" refers to a solid medium to which another substance is applied and to which that second substance may be bonded.

The term "synthetic rubber" includes materials which alternatively may be classified broadly as thermoplastic or thermosetting elastomers, such as polyurethanes, silicones, fluorosilicones, styrene-isoprene-styrene (SIS), and styrene-butadiene styrene (SBS), as well as other polymers which exhibit rubber-like properties, such as plasticized nylons, polyesters, ethylene vinyl acetates, and polyvinyl chlorides.

The recitation of numerical ranges using endpoints includes all numbers (e.g. 1 to 5 includes 1, 1.5, 3, 3.95, 4.2, 5, etc.) and subranges (e.g., 1 to 5 includes 1 to 4, 1.5 to 4.5, 1 to 2 etc.) subsumed within that range.

Figure 1:
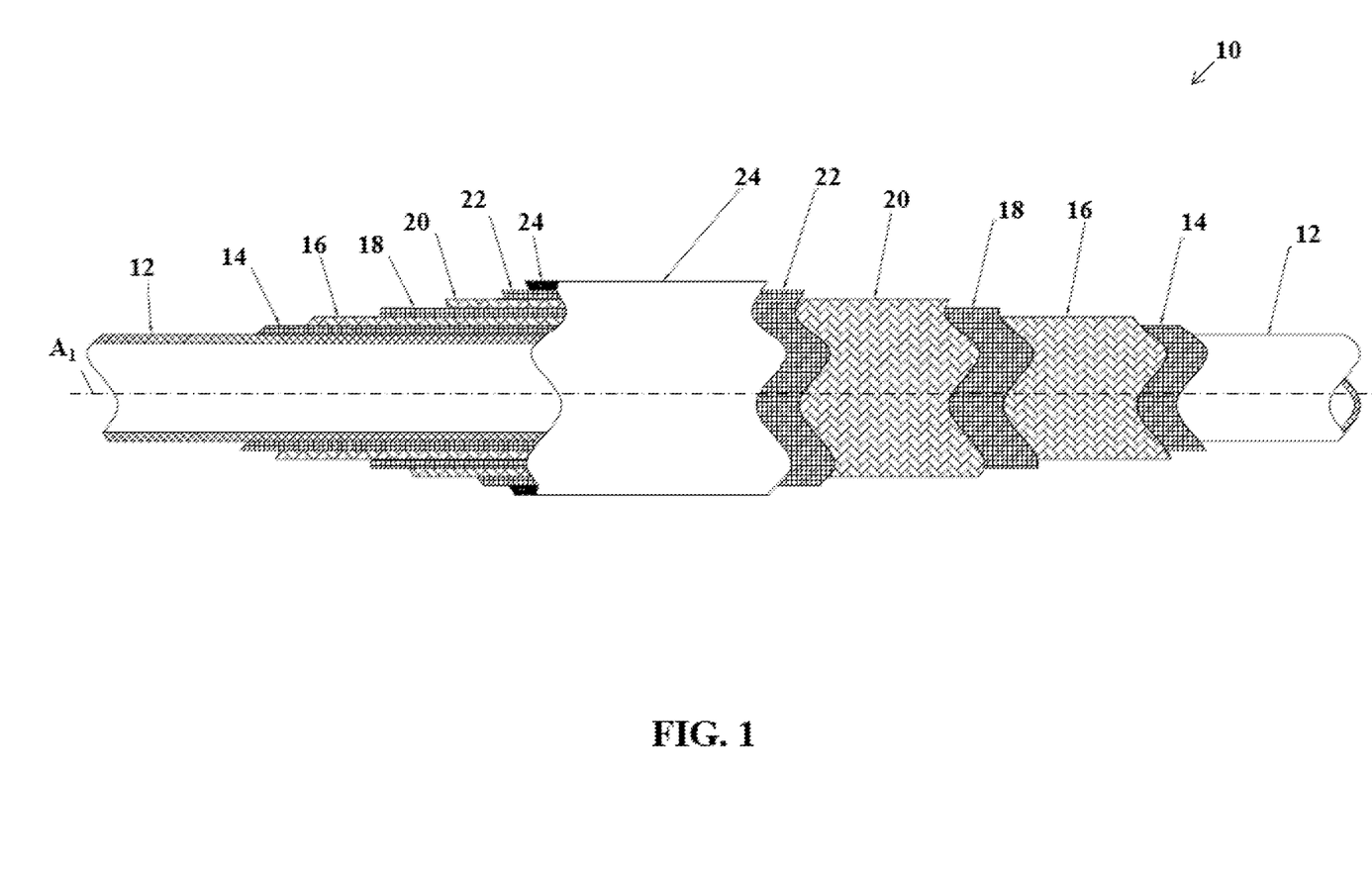
FIG. 1 is a side perspective cut-away view of a hose construction according to certain embodiments of the present invention.
Figure 2:
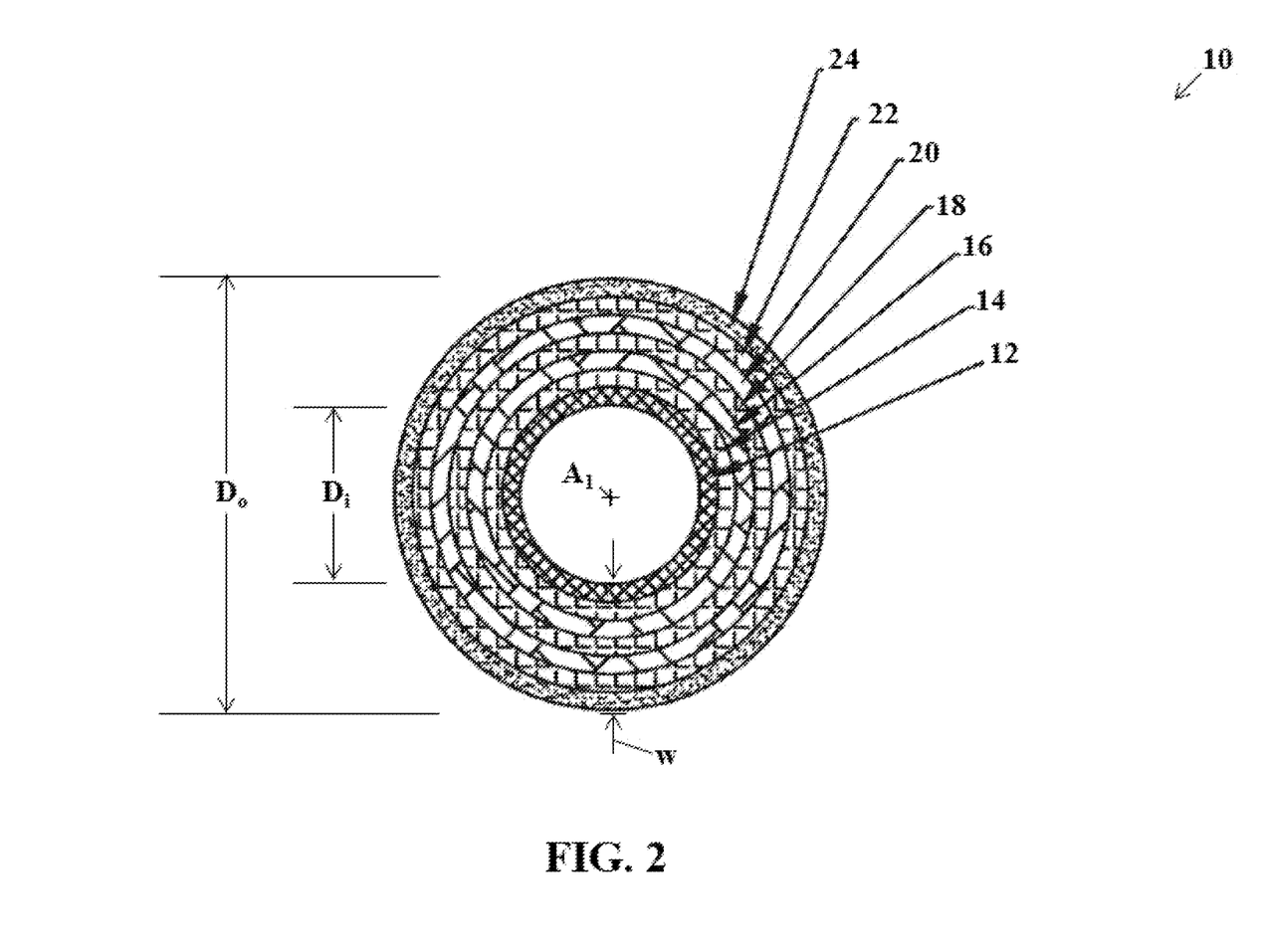
FIG. 2 is a radial cross-section view of the hose construction of FIG. 1.

Referring now generally to the figures wherein reference numerals are used to designate corresponding elements in each view, the present invention is described. FIGS. 1 and 2 show an embodiment of a hose assembly 10 in a cut-away and radial cross-sectional view, respectively. Hose assembly 10 includes core tube 12, first reinforcement layer 14, first polymer layer 16, second reinforcement layer 18, second polymer layer 20, third reinforcement layer 22, and outer protection layer 24.

In some aspects, outer protection layer 24 is optional. While shown to have multiple layers in FIGS. 1 and 2, in some aspects hose assembly 10 comprises one reinforcement layer 14 and one polymer layer 16 with optional protection layer 24 applied to outer polymer layer 16 when optional layer 24 is present. In some other aspects, hose assembly 10 comprises two reinforcement layers 14, 18, and two polymer layers 16, 20 with optional protection layer 24 then applied to the outer polymer layer 20 when optional layer 24 is present. In some aspects, hose assembly 10 comprises three reinforcement layer 14, 18, 22 and one polymer layer 16 with optional protection layer 24 applied outer reinforcement layer 18 when optional layer 24 is present. In still some other, hose assembly 10 comprises one or more reinforcement layers, one or more polymer layers, and an optional protection layer 24 applied to either the outer reinforcement layer or outer polymer layer when optional layer 24 is present.

In basic dimensions, hose assembly 10 extends axially to an indefinite length along a central longitudinal axis, axis $A_1$ in FIG. 1, and has a select inner and outer diameter referenced as $D_i$ and $D_o$, respectively, in FIG. 2. Inner and outer diameter dimensions $D_i$ and $D_o$ can define a wall thickness, w. The inner and outer diameter dimensions (e.g., $D_i$ and $D_o$) may vary depending on the fluid conveying application. For some such applications, e.g., inner diameter $D_i$ may be between about 3/32 inches and about 2 inches (0.24-5 cm) and outer diameter $D_o$ may be about 0.30 to about 2.8 inches (0.76-7.1 cm), such that wall thickness w can be between about 0.26 inches and about 0.40 inches (0.66-1.0 cm). The various layers of hose assembly 10 (e.g., reinforcement layers 14, 18 22, layers 16, 20 and outer protection layer 22) define wall thickness and each layer has an inner and outer diameter dimension that can be selected based on the desired application in view of this disclosure.

Figure 3:
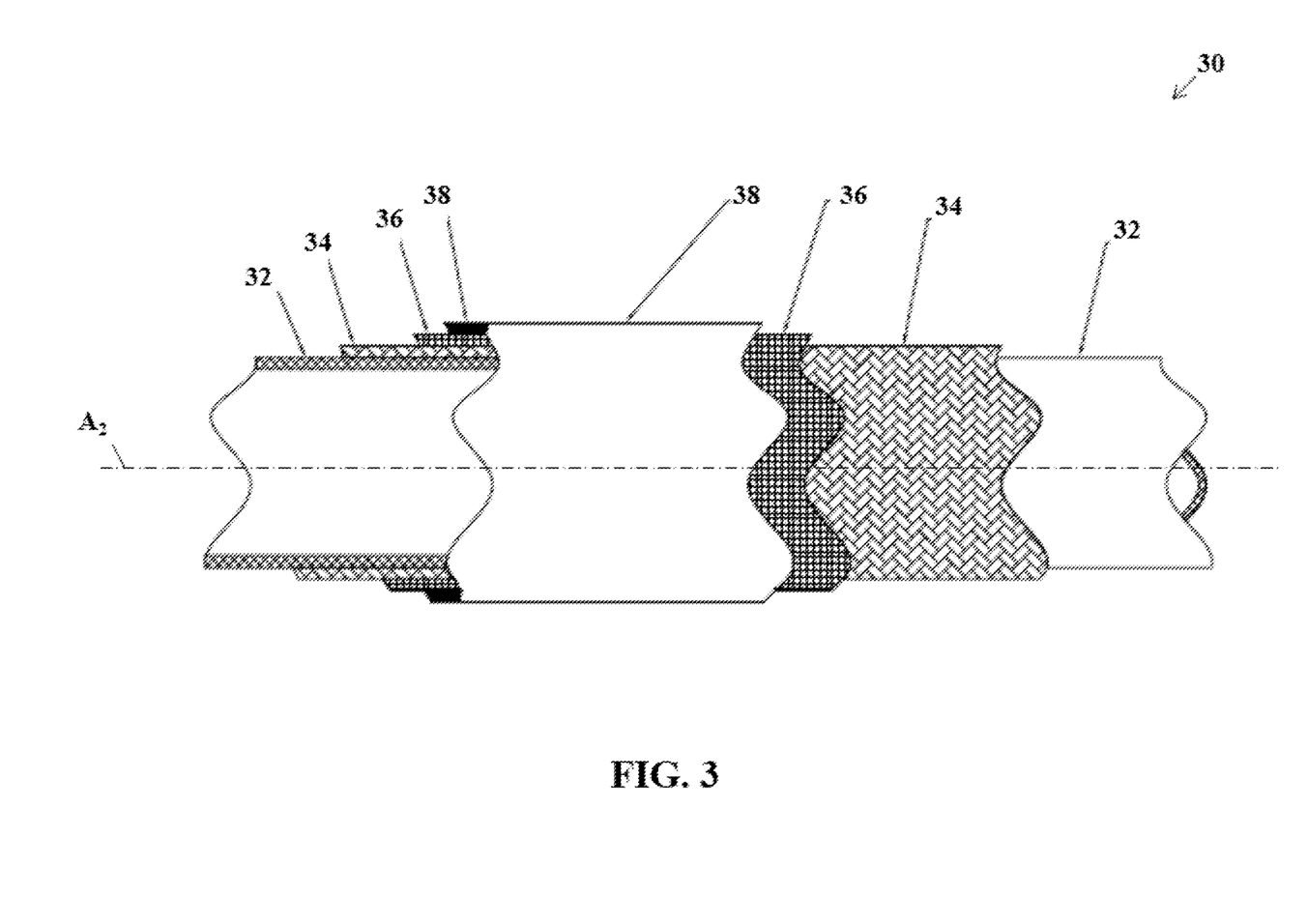
FIG. 3 is a side perspective cut-away view of another hose construction according to certain embodiments of the present invention.

FIG. 3 shows another embodiment of a hose assembly 30. As described above, the inner and outer dimensions of the hose assembly 30 and its various layers can be varied based on the desired application. The hose assembly 30 shown in FIG. 3 includes core tube 32, first layer 34, reinforcement layer 36, and outer protection layer 38. In some aspects, outer protection layer 38 is optional. Hose 30 can extend axially to an indefinite length along a central longitudinal axis, axis $A_2$, and can have a select inner and outer diameter dimensions, defining a wall thickness. The inner and outer dimensions of hose assembly 30 and its various layers (e.g., first layer 34, reinforcement layer 36, and outer protection layer 38) can be varied according to the desired application.

As may be seen from FIGS. 1-3, and as disclosed above, a variety of different layering and order of reinforcement layers and layers can be used for a hose assembly of the present invention. In some embodiments, a hose assembly may not have an outer protection layer. In other embodiments, a hose assembly may have a core tube, a reinforcement layer, and an outer protection later. In other embodiments, a hose assembly may have one or more layers and/or one or more reinforcement layers. In other embodiments, a hose assembly may have two or more reinforcement layers in succession. In still other embodiments, a hose assembly may have two or more layers of the same or different material layers in succession. In still other embodiments, a hose assembly may have a plurality of reinforcement layers, a plurality of layers between at least two reinforcement layers and an optional protection layer.

As may be seen from FIGS. 1-3, a hose assembly of present invention can be constructed as being formed about a core tube (e.g., core tube 12). A core tube can have a circumferential inner core tube surface defining an inner diameter of the hose (e.g., $D_i$ of hose 10) and a circumferential outer core tube surface, defining a core tube wall thickness. As with the overall dimensions of a hose assembly, the wall thickness of a core tube may vary depending on the desired application. For some applications, e.g., a core tube may have a wall thickness between about 0.02 inches to about 0.12 inch (0.51-3.1 mm).

A core tube may be provided as extruded or otherwise formed from a variety of materials. Non-limiting examples materials that can be used to make such an article include high density polyethylene (HDPE), low density polyethylene (LDPE), linear low density polyethylene (LLDPE), crosslinked polyethylene (PEX), vulcanized rubber, functional polyolefin copolymers including polyolefin based ionomers, polypropylene (PP), polyolefin copolymers (e.g., ethylene-butene, ethyleneoctene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides thermoplastic material, such as a polyolefin, polyester, fluoropolymer, polyvinyl chloride, ethylene vinyl alcohol (EVA), polyacetal polyurethanes, thermoplastic elastomers (e.g., SIS, SEBS, SBS), epoxies, alkyds, melamines, phenolics, ureas, vinyl esters, cyanate esters, silicones, or combinations thereof.

In some embodiments, a core tube extruded from a thermoplastic material, such as a polyolefin, polyester, fluoropolymer, polyvinyl chloride, ethylene vinyl alcohol (EVA), polyacetal, polyoxymethylene (POM), silicone, thermoplastic rubber, or polyurethane, or, a polyamide such as Nylon 6, 6/66, 11, 12, or 6/12, which may be selected for chemical compatibility with the fluid being handled, may be preferred. In other embodiments, a core tube extruded from a vulcanizable, i.e., thermosetting, or melt processable, i.e., thermoplastic, natural or Synthetic rubber such as SBR, polybutadiene, EPDM, butyl, neoprene, nitrile, polyisoprene, buna-N, copolymer rubber, or a blend such as ethylene-propylene rubber may be preferred.

A core tube can be compatible with or otherwise bondable to other layers (e.g., a polymer layer or reinforcement layer). A core tube may, e.g., be itself crosslinkable or crosslinkable to other layers. A core tube may include a crosslinkable polymer. Non-limiting examples of crosslinkable polyolefins include silane grafted polyethylene, silane grafted polyethylene copolymers (e.g., ethylene/hexane, ethylene/octane, ethylene/vinyl acetate, ethylene/acrylate, ethylene/propylene) and silane grafted polypropylene. Silane moieties grafted to the polymer backbone may include, for example, trimethoxy and triethoxy silane. Crosslinking reactions can be activated using crosslinkable polymers or monomers and free radical initiators. Non-limiting free radical initiators are any of those known in the art including diazo compounds and peroxy compounds. In view of this disclosure, those skilled in the art will recognize that the appropriate selection of a free radical initiator may in some embodiments be determined by the melt processing conditions (e.g., temperature and residence time) required to facilitate effective grafting of the crosslinkable monomer to the polymer backbone. The crosslinking reaction can be optionally accelerated by including a catalyst.

A core tube may include various additives and fillers. Non-limiting examples of additives include antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, coupling agents, pigments, colorants, and dyes. Non-limiting examples of fillers include inorganic and organic fillers (e.g., talc, mica, clay, silica, alumina, carbon fiber, carbon black glass fiber, fiber glass, etc.) and cellulosic materials (e.g., wood flour, wood fibers, sawdust, wood shavings, newsprint, paper, flax, hemp, wheat straw, rice hulls, kenaf, jute, sisal, peanut shells, soy hulls, or any cellulose containing material).

Although a core tube employing, e.g., fiberglass wetted with a heterophase polymer may be formed of a unitary, single-layer construction, a hose (e.g., hose 10 and hose 30) can be constructed with one or more layers (e.g., first layer 16, second layer 20, first layer 34) formed about a core tube, as may be seen in FIGS. 1-3. Such a layer can employ a variety of inner and outer circumferential diameters, defining a variety of possible radial wall thicknesses. Such a layer can include various materials (e.g., thermoplastics, additives, and fillers) and can be compatible with or otherwise bondable (e.g., crosslinkable) to a core tube, other layers, or a reinforcing layer, as described above with respect to a core tube.

In some multi-layer constructions, a core tube (e.g., core tube 12) may include an inner most layer or liner. The inner most layer or liner can define circumferential inner and outer layer surfaces extending along a central axis (e.g., axis $A_1$) and defining a radial, inner layer wall thickness. In some embodiments, an inner most layer (e.g., first layer 14) may be provided as extruded or otherwise formed of a melt processable thermoplastic, which may be a fluoropolymer, polyamide, or co-polyester, for chemical resistance. In some embodiments, preferred fluoropolymers can include polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetrafluoroethylene (ETFE) terpolymer, polyvinylidene fluoride (PVDF), polyvinylfluoride (PVF), and copolymers and blends thereof. For cost considerations, the wall thickness of innermost layer 20 may be maintained at the minimum necessary to provide the desired solvent, gas, or liquid permeation resistance, and for most applications may be between about 2-30 mils (0.05-0.76 mm).

As may be seen from FIGS. 1-3, a hose assembly 10, 30 can be constructed with one or more outer protection layers (e.g., outer protection layer 24 and outer protection layer 38). An outer protection layer can extend along a central longitudinal axis (e.g., employ a variety of inner and outer circumferential diameters, defining a variety of possible radial wall thicknesses). An outer protection layer can include various materials (e.g., thermoplastics, additives, and fillers) and can be compatible with or otherwise bondable (e.g., crosslinkable) to a core tube, one or more layers, a reinforcing layer, or other outer protection layers, as described above with respect to a core tube.

In some embodiments, an outer protection layer can be extruded or otherwise formed from a relatively flexible polymer material, which may be thermoplastic or otherwise melt processable or, alternatively, vulcanizable or otherwise cross-linkable or thermosetting. Such material may be selected for flexibility, that is, as having a lower flexural modulus than that of the material forming other layers or otherwise for temperature performance or compatibility with, e.g., a core tube, inner most layer, or reinforcing layer. Suitable materials can include plastics such as polyamides, polyesters, polyurethanes, polyolefins, polyvinyl chlorides, polyacetals, ethylene vinyl alcohols, polyoxymethylenes, natural rubbers such as Hevea and thermoplastic, i.e., melt-processable, or thermosetting, i.e., vulcanizable, Synthetic rubbers such as fluoropolymer, chlorosulfonate, polybutadiene, butyl, neoprene, nitrile, polyisoprene, and buna-N, copolymer rubbers such as ethylene-propylene (EPR), ethylene-propylene-diene monomer (EPDM), nitrile-butadiene (NBR) and styrene butadiene (SBR), or blends such as ethylene or propylene EPDM, EPR, or NBR, and copolymers and blends thereof.

In some embodiments, an outermost layer can be formed of a material which is compatible or otherwise bondable directly to the outer reinforcement layer (e.g., third reinforcement layer 22, second layer 36). Alternatively, the two layers may be bonded, if incompatible, means of a tie layer in a manner to be described hereinafter. For strength and flexibility considerations, the wall thickness of outermost layer 24, 38 may be thicker than that one or more of the inner layers, and can range from about 15 mils (0.38 mm) to about 110 mils (2.8 mm).

As may be seen from FIGS. 1-3, a hose can be constructed with one or more reinforcement layers. In some aspects, the one or more reinforcement layers may comprise reinforcement fibers at least partially treated or otherwise engaged with one or more resin-binders through various application methods, such as coating, wetting, impregnation, bonding, and the like.

Exemplary reinforcement fibers include but are not limited to graphite, glass, carbon, KEVLAR, aramid, fiberglass, boron, polyester fibers, polyamide, ceramic, inorganic or organic polymer fibers, mineral based fibers such as basalt fibers, metal fibers, and wire. For example, fibers can include glass fibers that comprise e-glass, e-cr glass, ADVANTEX™ glass, s-glass, d-glass, borosilicate glass, soda-lime glass or a corrosion resistant glass.

Exemplary binder-resins include heterophase polymers having a low viscosity and low molecular weight, such as the low molecular polyolefins available under the LICOCENE™ grades from CLAMANT. Such low molecular polyolefin examples include LICOCENE PP 1302, 1502, 1602, 2502, 2602 and 3602, which are metallocene propylene-ethylene-copolymers, LICOCENE PE 4421, 4351, 1332, 6252, 6452, which are stabilized maleic anhydride grafted polyethylene, LICOCENE PE 3361 and 1362, which are stabilized silane grafted polyethylene, and LICOCENE PP 6102, 6502 and 7502, which are metallocene polypropylene homopolymers. In some embodiments, the heterophase polymer is LICOCENE 1302 amorphous low molecular weight propylene-ethylene-copolymer wax. Other heterophase polymers that may be used include VISTAMAXX™ 3020 and VISTAMAXX 6102 propylene elastomers from ExxonMobil, and ENGAGE 8200 ethylene-octene high flow low density polyolefin elastomer, AFFINITY GA 1900 polyolefin elastomer and AFFINITY GA1950 polyolefin elastomer from Dow.

In some aspects, the binder-resin comprises a propylene-ethylene-copolymer having an ethylene content between about 10 wt-% and about 20 wt-%, in some aspects between about 11 wt-% and about 19 wt-% and in some other aspects between about 11 wt-% and about 16 wt-%. In some aspects, the propylene-ethylene copolymer has a density between about 0.85 and about 0.89, in some aspects between about 0.855 and about 0.88, and in some other aspects between about 0.86 and about 0.87, g/cm$^3$.

In some aspects, the at least one resin-binder has a melt viscosity of less than about 20,000 centipoise at 176° C., in some aspects less than about 15,000 centipoise at 176° C., in some aspects less than about 10,000 centipoise at 176° C., in some aspects less than about 5,000 centipoise at 176° C., in some aspects less than about 2000 centipoise at 176° C., in some preferred aspects less than about 1000 centipoise at 176° C., and in some even more preferred aspects less than about 500 centipoise at 176° C.

In some aspects, the at least one resin-binder has a melt viscosity between about 150 and about 20,000 centipoise at 176° C., in some aspects between about 150 and about 15,000 centipoise at 176° C., in some aspects between about 150 and about 10,000 centipoise at 176° C., in some aspects between about 150 and about 7,000 centipoise at 176° C., in some aspects between about 150 and about 5,000 centipoise at 176° C., in some aspects between about 150 and about 2000 centipoise at 176° C., in some preferred aspects between about 150 and about 1000 centipoise at 176° C., and in some even more preferred aspects between about 150 and about 500 centipoise at 176° C.

Without intending to be bound by theory, the one or more resin-binders, having sufficiently low molecular weight and viscosity, can fill or otherwise reduce interstices, voids, air bubbles, and/or flaws within the reinforcement fibers or that might potentially form at an interface between the reinforcement fibers or polymer layer, thereby reducing interfacial surface tension and providing greater compatibility between the reinforcement layer adjacent layers of the hose assembly.

The reinforcement fibers can include structural fibers and flexible yarn components. The structural fibers can be formed of carbon, aramid, thermoplastic, polyester, polyamide, carbon, KEVLAR, inorganic compounds such as basalt or boron, metal and/or glass. The flexible yarn components, or braiding fibers, can be formed of either polyamide, polyester, aramid, thermoplastic, carbon, KEVLAR, boron, inorganic compounds such as basalt or boron, glass and/or ceramic. The fibers included in the reinforcement fibers can be woven, braided, knitted, stitched, circumferentially, axially or hoop wound, helically wound, and/or other textile form to provide a desired orientation, such as at a pitch angle between about thirty degrees and about seventy degrees relative to a longitudinal axis.

As may be seen from FIGS. 1-3, a hose can be constructed with one or more polymer layers comprising one or more polymers or copolymers. The polymers or copolymers of each polymer layer can be selected to provide desired properties (e.g., flexibility, fluid incompatibility, strength, elongation, coefficient of thermal expansion, tensile strength, flexural modulus, etc.). A variety of different polymers or copolymers may be used, including thermoplastics. In some preferred aspects, a cross-linkable or cross-linked polymer or copolymer can be used to form the polymer layer. For cross-linkable polymers or copolymers, a variety of different mechanisms can be used to facilitate cross-linking, including radiation, silane grafting, peroxide, or azo methods. In some aspects, the polymer layer can comprise a cross-linkable or cross-linked thermoplastic, like cross-linkable polyethylene (XPLE) or cross-linked polyethylene (PEX). In some embodiments, the polymer or copolymer of the polymer layer and resin-binder may be selected for compatibility and cross-linkability, such as an XPLE resin-binder and polymer.

In some aspects, the polymer layer may comprise a thermoplastic material selected from the group consisting of polyamides, polyolefins, polyvinyl chlorides, silicones, fluoropolymers, polyurethanes, natural and synthetic rubbers, and copolymers and blends thereof.

In some aspects, the fiber-reinforced composites and related articles are made using melt processing techniques, e.g., extrusion. In some embodiments, a method for making an article can include impregnating or coating at least a portion of the reinforcement fibers with a binder (e.g., by pultrusion), applying a resin-binder, preferably a cross-linkable thermoplastic, to the coated reinforcement fibers (optionally binder-wetted), extruding the polymer layer, such as a cross-linkable thermoplastic, as an extrudate, winding the reinforcement fibers about the extrudate, and initiating a cross-linking reaction to facilitate cross-linking between the reinforcement layer and the polymer layer. In some embodiments, no binder is employed prior to application of the resin-binder, but the reinforcement and polymer layers are cross-linkable or cross-linked.

In preferred embodiments, a hose assembly including a fiber-reinforced composite of the present invention can be continuously extruded without a mandrel and optionally cross-linked with one or more polymer layers during processing. In some embodiments, a mandrel may be used for a portion of processing. In some embodiments, a hose assembly that includes a fiber-reinforced composite of the present invention can be used to convey fluids under pressure.

In some embodiments, a separate extruder or pump (e.g., a resin pump) may be used to introduce sizing (e.g., glass sizing) or adhesive (e.g., a heterophase polymer or other binder resin) as a tie layer between a component or layer of the disclosed hose assembly, fiber-reinforced composite or other related article and another component or layer of such article. Doing so may improve adhesion of the component(s) or layer(s) to one another during or after manufacture, and may improve other properties such as shape stability, strength, rigidity or resistance to deformation of such article or portion(s) thereof during or after manufacture. For example, a tie layer may be added to a partially-completed hose assembly preform to prevent kinking of the preform during manufacturing.

In some embodiments, vacuum, pressure or imparting an elevated temperature to one or more components or layers of the disclosed hose assembly, fiber-reinforced composite or other related article may be used to improve wetting, penetration or the filling of voids during the manufacture of such article, and to improve properties such as shape stability, strength, rigidity or resistance to deformation of such article or portion(s) thereof during or after manufacture. For example, a wire or fiber reinforcing layer may be heated to an elevated temperature and vacuum may be employed to promote penetration of a binder resin into voids in the reinforcing layer.

The compositions, articles, and methods of producing and using the same can provide numerous benefits. The composites and articles, e.g., can provide better compatibility between reinforcement fibers and polymeric matrices and superior mechanical properties, including, in some applications, improved tensile strength while maintaining a desired flexural modulus. In some embodiments, the methods of making these composites and articles can provide a continuous alternative to batch processes typically employed. For hoses in particular, these composites, articles, and methods can provide better mechanical properties and reduce the failure modes of typical hoses, including those resulting from artifacts of processing with a mandrel.

What is claimed is:

1. A hose adapted for conveying fluids under pressure, the hose extending in an axial direction along a central longitudinal axis and in a radial direction circumferentially about the longitudinal axis, the hose comprising:
   (A) a core tube having a circumferential inner core tube surface and a circumferential outer core tube surface; and
   (B)(i) a first reinforcement layer surrounding the circumferential outer core tube surface, the reinforcement layer having one or more filaments of a first fiber, wherein at least a portion of a surface of the one or more filaments is wetted with a heterophase polymer, or (B)(ii) the first reinforcement layer surrounding the circumferential outer core tube surface, the reinforcement layer having one or more filaments of the first fiber, and a second reinforcement layer surrounding the first reinforcement layer, the second reinforcement layer having one or more filaments of a second fiber, wherein at least a portion of a surface of the one or more filaments of a) the first fiber, or b) the second fiber, or c) the first and second fibers are wetted with a heterophase polymer.

2. The hose according to claim 1, wherein the hose comprises:

the first reinforcement layer surrounding the core tube, the first reinforcement layer being formed of one or more filaments of at least the first fiber and being spiral wound in a first winding direction around the circumferential outer core tube surface;

the second reinforcement layer surrounding the first reinforcement layer and the core tube, the second reinforcement layer being formed of one or more filaments of at least the second fiber and being spiral wound in a second winding direction different than the first winding direction;

wherein at least a portion of a surface of the one or more filaments of the first fiber and at least a portion of a surface of the one or more filaments of the second fiber are wetted with the heterophase polymer.

3. The hose according to claim 1, wherein the heterophase polymer has a viscosity of less than about 2000 mPa's (2,000 centipoise at 176° C.).

4. The hose according to claim 1, wherein the heterophase polymer has a viscosity between about 150 and about 1000 centipoise at 176° C.

5. The hose according to claim 1, wherein the heterophase polymer is a low molecular weight polyolefin selected from a metallocene propylene-ethylene-copolymer, a stabilized maleic anhydride grafted polyethylene, a silane grafted polyethylene, a propylene-ethylene-copolymer, an ethylene-octene copolymer, and a metallocene polypropylene homopolymer, or combinations thereof.

6. The hose according to claim 1, wherein the heterophase polymer comprises a propylene-ethylene-copolymer having an ethylene content between about 10 wt-% and about 20 wt-%.

7. The hose according to claim 1, wherein the heterophase polymer comprises a propylene-ethylene copolymer having a density between about 0.85 and about 0.89 g/cm$^3$.

8. The hose according to claim 1, wherein the heterophase polymer includes propylene elastomer, ethylene-octene high flow low density polyolefin elastomer, or metallocene polyolefin elastomer.

9. The hose according to claim 1, wherein the heterophase polymer includes amorphous low molecular weight propylene-ethylene-copolymer wax.

10. The hose according to claim 1, wherein the heterophase polymer includes an alpha-olefin polymer.

11. The hose according to claim 1, wherein the heterophase polymer includes a metallocene catalyzed/ethylene alpha-olefin polymer.

12. The hose according to claim 1, wherein the heterophase polymer includes a polyolefin elastomer.

13. The hose according to claim 1, wherein the core tube includes a crosslinkable thermoplastic.

14. The hose according to claim 1, further comprising a cover having a circumferential inner cover surface and a circumferential outer cover surface, the cover surrounding the reinforcement layer(s).

15. The hose according to claim 1, further comprising a polymer layer surrounding at least one of the reinforcement layers.

16. The hose according to claim 15, further comprising a cover having a circumferential inner cover surface and a circumferential outer cover surface, the cover surrounding the polymer layer.

17. The hose according to claim 1, wherein the hose has a maximum working pressure of at least about 20,300 MPa.

18. The hose according to claim 1, wherein the hose has a minimum bend radius of at least about 280 mm or less.

19. The hose according to claim 1, wherein the hose has a linear density less than about 1.22 kg/m.

20. An extrudate comprising:

a first layer extrudate having an external first layer surface;

a reinforcement layer extrudate surrounding at least a portion of the first layer, the reinforcement layer extrudate being a composite formed of one or more filaments of a fiber and one or more heterophase polymers.

21. A method comprising:

impregnating at least a portion of a strand having a plurality of filaments of a fiber with a heterophase polymer using melt pultrusion to form a heterophase polymer wetted strand;

applying a thermoplastic to at least a portion of the heterophase polymer wetted strand to form a polymeric composite;

extruding a crosslinkable thermoplastic to form a crosslinkable thermoplastic extrudate having an outer surface;

winding the polymeric composite about the outer surface of the crosslinkable thermoplastic extrudate during the extruding step; and initiating a crosslinking reaction within the crosslinkable thermoplastic extrudate to facilitate bonding with the polymeric composite.

22. The method according to claim 21, wherein the heterophase polymer includes an alpha-olefin polymer.

* * * * *